July 16, 1929.  R. S. DEAN  1,720,722
SLUG FOR USE IN EXTRUSION OPERATIONS AND METHOD OF EXTRUSION
Filed Nov. 26, 1927
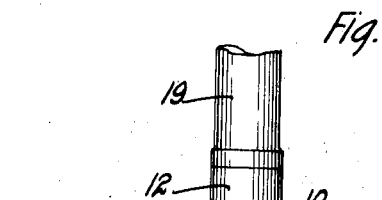
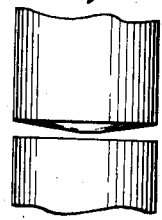
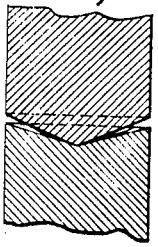
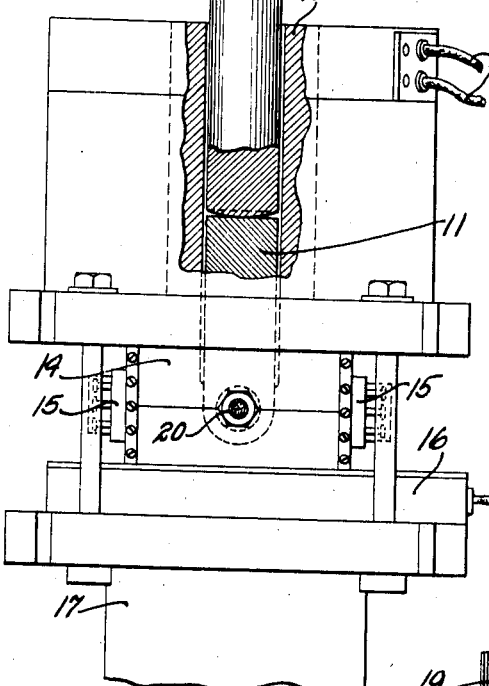
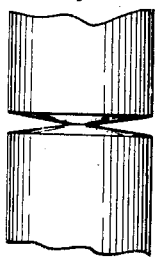
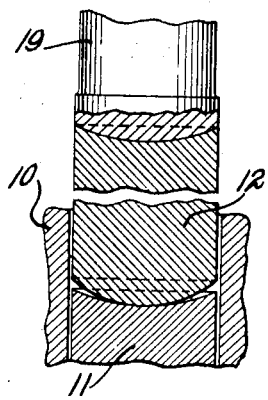
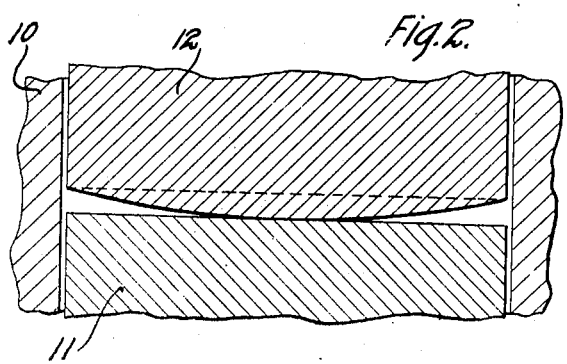
Inventor
Reginald S. Dean
by (signature) Att'y Patented July 16, 1929.

1,720,722

UNITED STATES PATENT OFFICE.

REGINALD SCOTT DEAN, OF RIVERSIDE, ILLINOIS, ASSIGNOR TO WESTERN ELECTRIC COMPANY, INCORPORATED, OF NEW YORK, N. Y., A CORPORATION OF NEW YORK.

SLUG FOR USE IN EXTRUSION OPERATIONS AND METHOD OF EXTRUSION.

Application filed November 26, 1927. Serial No. 235,824.

This invention relates to slugs for use in extrusion operations and methods of extrusion.

Objects of the invention are to provide an improved type of slugs for use in extrusion operations and to provide a method of extrusion employing slugs in which substantially perfect union between adjacent slugs employed therein is effected during extrusion.

In one embodiment of the invention there are provided so-called "cone-bottomed" metallic slugs comprising slugs having one end conical in shape. In the extrusion operation, the conical end of one slug is placed in contact with the opposite end of an adjacent slug and initially effects contact therewith over a small area. Pressure is then applied to the slugs to cause the abutting surfaces thereof to unite from the area of contact outwardly to expel air from between the slugs and to effect a substantially perfect union between the slugs.

The invention may be readily understood from the following description of a method of extrusion embodying the invention, taken in connection with the accompanying drawing illustrating a number of slugs suitable for use in practicing the method and also embodying the invention. In the drawing, Fig. 1 is a fragmentary elevational view, partly broken away, of an extrusion press which may be used to practice the method embodying the invention and in which improved slugs embodying the invention may be employed;

Fig. 2 is an enlarged fragmentary view of a part of the apparatus and of the slugs illustrated in Fig. 1, and Figs. 3 to 8, inclusive, illustrate various modifications of slugs forming a part of the invention and which may be utilized in practicing the method embodying the invention.

Referring now to the drawing in detail, the numeral 10 indicates the cylinder of an extrusion press of the same general type as is illustrated in the copending application, Serial No. 197,270, filed June 8, 1927, by T. A. Daniel. A portion of a partially extruded slug 11 is shown positioned in the lower end of the cylinder 10, above which is positioned a so-called "cone-bottomed" slug 12. The cylinder 10 is provided with suitable heating means 13 and is securely mounted upon a die block 14 provided with suitable heating units 15—15 and having a die 20 positioned therein, which block is in turn positioned upon a heating plate 16 resting upon a ram 17 operated in any suitable manner, such as by hydraulic means (not shown). The ram 17 may be raised or lowered as desired to effect a relative movement between the above mentioned members and a piston 19 rigidly positioned in alignment with the aperture in the extrusion cylinder 10. As is more clearly shown in Fig. 2, the upper end of the slug 11 is flat, while the lower end of the similar slug 12 is so formed as to initially effect substantially a point contact with the end of the slug 11, and the slugs are also initially slightly smaller in diameter than the diameter of the aperture in the cylinder 10.

In practicing the method embodying the invention, a slug, such as the slug 11, made of any extrudible material, such as a lead alloy, is heated in a suitable furnace (not shown) to an extrusion temperature, the slug is placed within the cylinder 10 and extruded through the die 20 in the die block 14 into any desired shape, such as a sheath, a tube or a cylinder, the heating units 13 and 15—15 and the heating plate 16 meanwhile maintaining the slug at an extrusion temperature. After the metal forming the slug 11 has been partially extruded, the ram 17 is lowered to remove the piston 19 from within the extrusion cylinder 10 and a heated "cone-bottomed" slug 12 is inserted within the cylinder 10 upon the partially extruded slug 11, as is clearly shown in Figs. 1 and 2. The ram 17 is then raised until the piston 19 comes into contact with the upper end of the slug 12 whereupon pressure will be exerted thereon. The contact between the lower end of the slug 12 and the upper end of the partially extruded slug 11 is initially over such a small area as to constitute substantially a point contact which is approximately in the center of the respective slugs and as the pressure upon the slugs is increased the area of contact between the two slugs also increases from the area of initial contact outwardly, the slugs meanwhile fusing together into a single body until the slugs have united across the entire surfaces of the abutting ends thereof. As the slugs unite the air therebetween is forced from the center of the intervening space outwardly and escapes through the space between the slug 12 and the cylinder 10, and since the union between the slugs takes place from the center outwardly the entire quantity of air initially present therebetween is expelled, thereby permitting a substantially perfect union between the slugs to be effected thus eliminating blisters and irregularities in the finished product.

Although the upper end of the slug 11 as illustrated in Figs. 1 and 2 is flat and the lower end of the slug 12 is spherical in shape, the ends of the slugs may be of any shape which will permit the slugs to effect substantially a point contact therebetween or to initially contact with each other over a very small area and a number of modifications of the slugs illustrated in Figs. 1 and 2 are shown in Figs. 3 to 8, inclusive. In the modification disclosed in Fig. 3, one end of the slug is flat and the other end is a true cone, while in the modification illustrated in Fig. 4 one end of the slug is flat and the opposite end has the form of a truncated cone, either of which forms permits the opposite ends of the adjacent slugs to contact with each other over a very small area. In the modification illustrated in Fig. 5, one end of the slug is concave and the opposite end is convex, the opposite ends having different radii of curvature. The modification illustrated in Fig. 6 is similar to that shown in Fig. 5 except that the depressed portion and the protruding portion thereof are conical instead of spherical. In the modifications shown in Figs. 7 and 8, both ends of the slugs protrude so as to effect contact with each other over a very small area, the slugs illustrated in Fig. 7 having spherical ends, while the ends of the slugs illustrated in Fig. 8 have the form of truncated cones.

In utilizing the slugs illustrated in Figs. 5 to 8, inclusive, the end of the plunger 19 must be shaped so as to conform with the end of the slug in contact therewith in order to prevent deformation of that end during the partial extrusion thereof effected while the plunger 19 is in contact therewith. For example, as is shown in Fig. 5, the lower end of the plunger 19 is convex so as to conform with the upper concave end of the slug in contact therewith, and in employing the slugs illustrated in the other figures, the end of the ram may be shaped accordingly to conform to the shapes of the ends of those slugs.

By the term "cone-bottomed" or "conical" as employed hereinbefore in the specification and hereinafter in the appended claims is meant a slug having an end which is regularly protuberant, bulging or convergent, and may include a slug having an end surface which is either spherical, a true cone, a conoid, etc., or any surface which has one point thereon protruding beyond all other points thereon.

What is claimed is:

1. A slug for use in extrusion operations comprising a body portion and a bulging end portion for initially effecting contact with an adjacent slug over a small area in an extrusion operation.

2. A metallic slug for use in extrusion operations comprising a cylindrical body portion and a conical end portion for initially effecting substantially a point contact with the end of an adjacent slug during extrusion.

3. A metallic slug for use in extrusion operations comprising a cylindrical body portion and an end portion having one point thereof protruding beyond all other points thereon.

4. A metallic slug for use in extrusion operations comprising a body portion having one end thereof flat and the other end of such shape as to initially effect substantially a point contact with the flat end of a similar adjacent slug during extrusion.

5. A lead alloy slug for use in extrusion operations comprising a body portion having a protuberance upon one end thereof to initially effect substantially a point contact with an adjacent slug and to unite therewith from the point of contact outwardly during an extrusion operation.

6. A lead alloy slug for use in extrusion operations comprising a body portion and a protruding end portion for initially effecting contact with an adjacent slug over a small area and to unite therewith from the area of contact outwardly during an extrusion operation.

7. A method of extrusion which consists in contacting a small area of one metal slug with another slug and subjecting the slugs to pressure to cause the abutting surfaces of the slugs to unite from said small area outwardly and to effect extrusion thereof.

8. A method of extrusion which consists in placing a plurality of metal slugs in axial alignment, initially contacting a small area on the end of one of the slugs with the end of an adjacent slug, and subjecting the slugs to pressure to cause the abutting surfaces of the slugs to unite from said small area outwardly, to fuse the slugs into a single body and to effect extrusion thereof.

9. A method of extrusion which consists in heating a plurality of slugs to an extrusion temperature, placing the slugs in axial alignment, initially contacting a small area on the end of one of the slugs with the end of an adjacent slug, and subjecting the slugs to pressure to cause the abutting surfaces of the slugs to unite from said small area outwardly, to fuse the slugs into a single body and to effect extrusion thereof.

10. A method of extrusion which consists in effecting substantially a point contact between the ends of metal slugs, and causing the slugs to unite from the point of contact outwardly to expel air from therebetween and to effect extrusion thereof.

11. A method of extrusion which consists in initially contacting substantially the central point on the end of one slug with a similar point on another slug, and subjecting the slugs to pressure to cause the slugs to unite from the center outwardly into a single body and to effect extrusion thereof.

In witness whereof, I hereunto subscribe my name this 12th day of November A. D., 1927.

REGINALD SCOTT DEAN.